(12) United States Patent
Messenger

(10) Patent No.: US 6,196,586 B1
(45) Date of Patent: Mar. 6, 2001

(54) SYSTEM FOR FRAME LEVELING AND STABILIZING A FORKLIFT

(75) Inventor: John E. Messenger, Newville, PA (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/366,572

(22) Filed: Aug. 4, 1999

Related U.S. Application Data

(60) Provisional application No. 60/095,257, filed on Aug. 4, 1998.

(51) Int. Cl.$^7$ .................................................. B60S 9/02
(52) U.S. Cl. ........................................................ 280/763.1
(58) Field of Search ........................... 280/763.1, 764.1, 280/765.1, 766.1, 6.153, 6.155, 6.156, 6.154, FOR 101, FOR 102, FOR 103; 254/418, 89 H, 93 R; 91/418, 437, 459, 462; 60/420, 426

(56) References Cited

U.S. PATENT DOCUMENTS

| | | | |
|---|---|---|---|
| 3,709,518 | * | 1/1973 | Gauchet ............................ 280/764.1 |
| 3,710,695 | * | 1/1973 | Miller et al. ........................ 180/434 |
| 4,120,507 | * | 10/1978 | Miller ................................ 280/6.154 |
| 4,860,539 | * | 8/1989 | Parrett et al. ......................... 60/426 |
| 5,497,692 | * | 3/1996 | Marcott ................................. 91/523 |

\* cited by examiner

Primary Examiner—Brian L. Johnson
Assistant Examiner—G Klebe
(74) Attorney, Agent, or Firm—Michael Best & Friedrich LLP

(57) ABSTRACT

A system is provided for leveling and stabilizing a forklift vehicle having a frame and at least one and preferably two axles pivotally connected with the frame. The system includes a frame leveler device including a hydraulic cylinder extending between the frame and the front axle and configured to move the frame with respect to the axle. A stabilizer device is mounted to the frame and includes a pair of arms and two stabilizer hydraulic cylinders. Each stabilizer cylinder has a piston with a rod connected with a separate one of the arms and a base chamber on one side of the piston. Further, a fluid exchange line extends between the base chambers of the two stabilizer cylinders and an exchange valve controls flow through the exchange line. A controller is connected with the leveler cylinder and with the exchange valve and is configured to open the valve when the leveler cylinder displaces the frame with respect to the axle such that the stabilizer cylinders are each retractable and extendable during movement of the frame. More specifically, movement of the frame with respect to the axle when the arm portions contact the ground surface causes hydraulic fluid to between the stabilizer cylinders such that the piston rod of one cylinder retracts and the rod of the other cylinder extends while the stabilizer arms remain substantially stationary.

9 Claims, 3 Drawing Sheets

US 6,196,586 B1

SYSTEM FOR FRAME LEVELING AND STABILIZING A FORKLIFT

This application claims the benefit of U.S. Provisional Application No. 60/095,257, filed Aug. 4, 1998.

BACKGROUND OF THE INVENTION

The present invention relates to forklift vehicles, and more particularly to forklift vehicles having frame leveling and stabilizing devices.

Forklift vehicles or "forklifts" are well known. Such vehicles generally include a vehicle frame and two axles with wheels mounted thereon attached to the frame. Further, an operator station and a lifting mechanism (i.e. a "forklift") are each mounted on the frame. Particularly with forklift vehicles used in uneven or rough terrain, such forklift vehicles are often provided with both a frame leveling device and a stabilizing device. A frame leveling device or "frame leveler" typically includes one or more hydraulic cylinders extending between the frame and at least one of the axles. The frame leveler functions by moving the frame relative to the axle(s) such that the frame is generally horizontally positioned on the adjacent ground surface (i.e., "level"). Further, a stabilizing device or "stabilizer" typically includes a pair of support arms mounted to either the frame or one of the axles and which are engageable with the ground surface adjacent to the forklift vehicle. The stabilizer arms support the vehicle to prevent lateral movement and/or toppling of the vehicle during use.

Generally, presently known systems for leveling and stabilizing a forklift vehicle frame have disadvantages. With a vehicle having a stabilizer device mounted to the vehicle frame, the frame cannot be leveled when the stabilizer arms are deployed as the arms act as "bracing" members that resist or prevent the necessary movement of the frame with respect to the axle. Further, systems in which the stabilizers are mounted to the axle require reinforced axles, are difficult to install and service and are generally much more expensive to produce than frame-mounted stabilizer devices. Therefore, it is desirable to provide a system for leveling and stabilizing a forklift vehicle which overcomes the limitations of known systems.

SUMMARY OF THE INVENTION

In one aspect, the present invention is a system for leveling and stabilizing a vehicle upon a ground surface, the vehicle having a frame and at least one axle pivotally connected with the frame. The system comprises a frame leveler device configured to move the frame with respect to the axle. A stabilizer device is mounted to the frame and includes a pair of arms, each arm having a portion contactable with the ground surface, and two stabilizer hydraulic cylinders. Each stabilizer cylinder has a piston with a rod connected with a separate one of the arms and a base chamber on one side of the piston. Further, a fluid exchange line extends between the base chamber of one stabilizer cylinder and the base chamber of the other stabilizer cylinder. Movement of the frame with respect to the axle when the arm portions are in contact with the ground surface causes hydraulic fluid to flow from one stabilizer cylinder and into the other stabilizer cylinder such that the piston rod of the one cylinder to retract and the piston rod of the other cylinder to extend while the stabilizer arms remain substantially stationary.

In another aspect, the present invention is also a system for leveling and stabilizing a vehicle having a frame and an axle pivotally connected with the frame. The system comprises a frame leveler device including a leveler hydraulic cylinder having a first end connected with the frame and a second end connected with the axle and configured to move the frame with respect to the axle. A stabilizer device is mounted to the frame and includes a pair of arms and two stabilizer hydraulic cylinders. Each stabilizer cylinder has a piston with a rod connected with a separate one of the arms and a base chamber on one side of the piston. Further, a fluid exchange line extends between the base chamber of one stabilizer cylinder and the base chamber of the other stabilizer cylinder and an exchange valve controls flow through the fluid exchange line. A controller is connected with the leveler cylinder and with the exchange valve and is configured to open the valve when the leveler cylinder displaces the frame with respect to the axle such that the stabilizer cylinders are each retractable and extendable during movement of the frame.

BRIEF DESCRIPTION OF THE SEVERAL VIEWS OF THE DRAWINGS

The foregoing summary, as well as the detailed description of the preferred embodiments of the invention, will be better understood when read in conjunction with the appended drawings. For the purpose of illustrating the invention, there is shown in the drawings, which are diagrammatic, embodiments that are presently preferred. It should be understood, however, that the invention is not limited to the precise arrangements and instrumentalities shown. In the drawings.

DETAILED DESCRIPTION OF THE INVENTION

Figure 1:
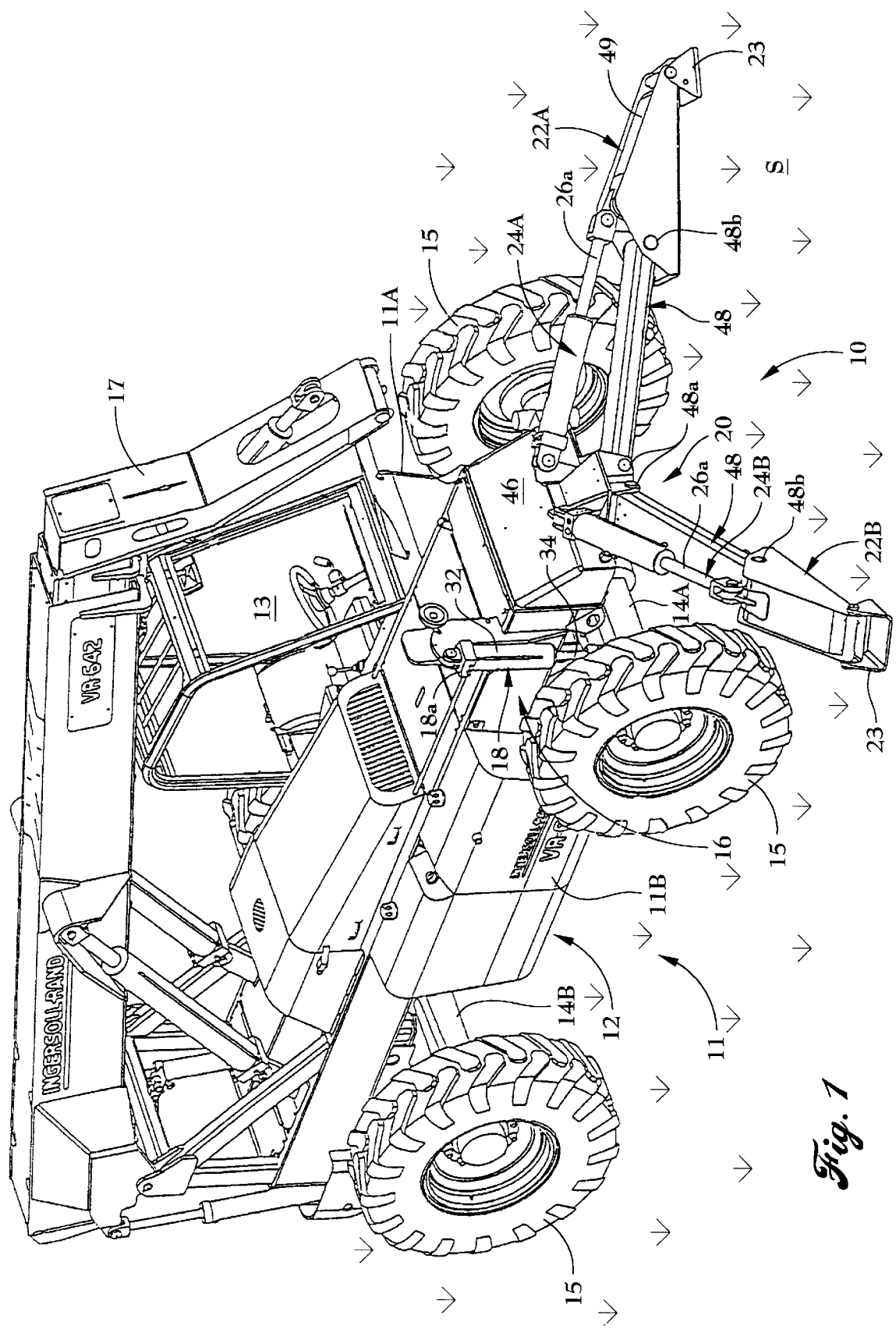
FIG. 1 is a front perspective view of a preferred vehicle having a system for frame leveling and stabilizing a vehicle in accordance with the present invention.

Certain terminology is used in the following description for convenience only and is not limiting. The words "right", "left", "lower", "upper", "upward", "down" and "downward" designate directions in the drawings to which reference is made. The words "front", "frontward" and "rear", "rearward" refer to directions toward and away from, respectively, a designated front end of a vehicle incorporating the system of the present invention. The terminology includes the words specifically mentioned above, derivatives thereof, and words of similar import.

Figure 2:
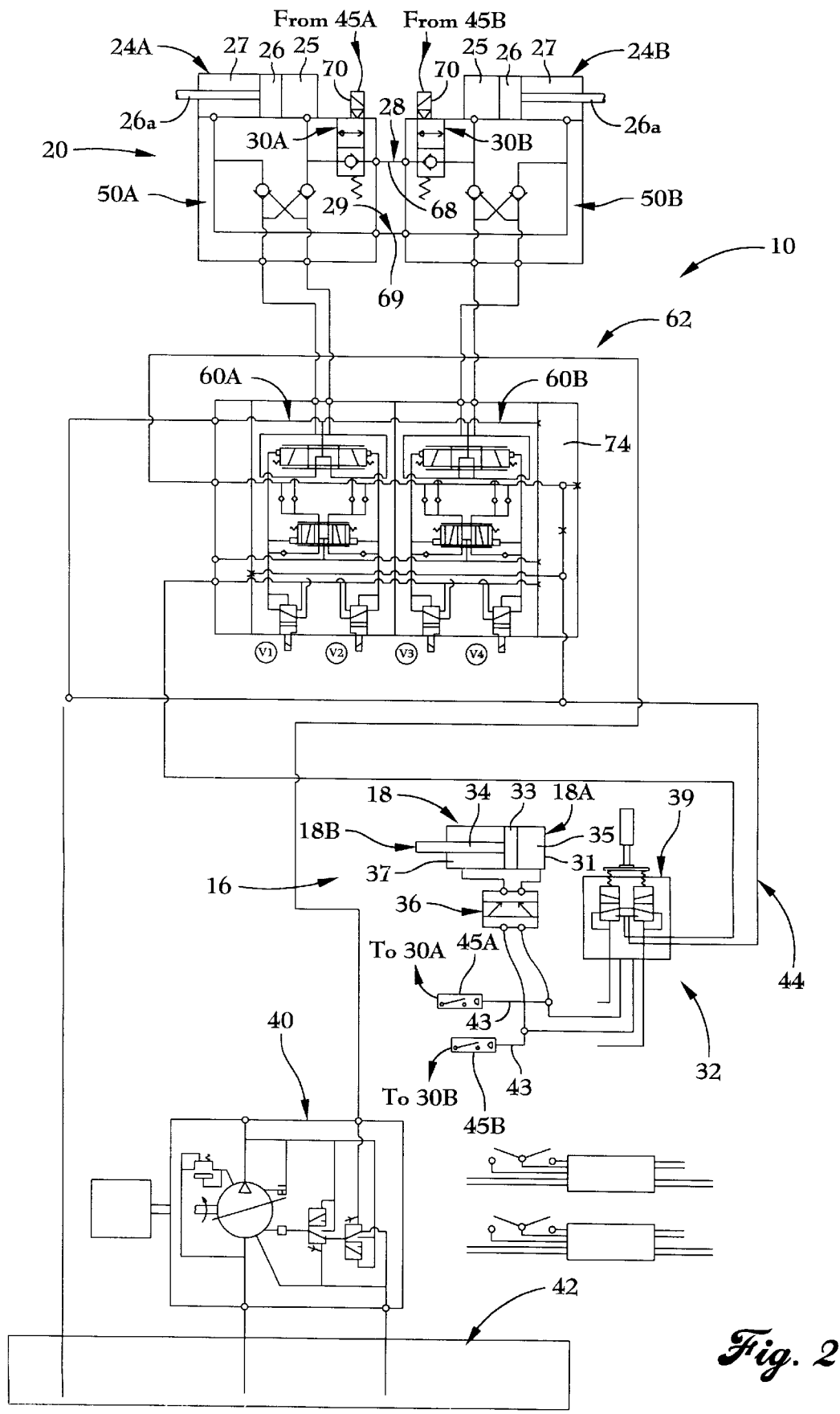
FIG. 2 is a schematic diagram of a control system in accordance with the present invention.
Figure 3:
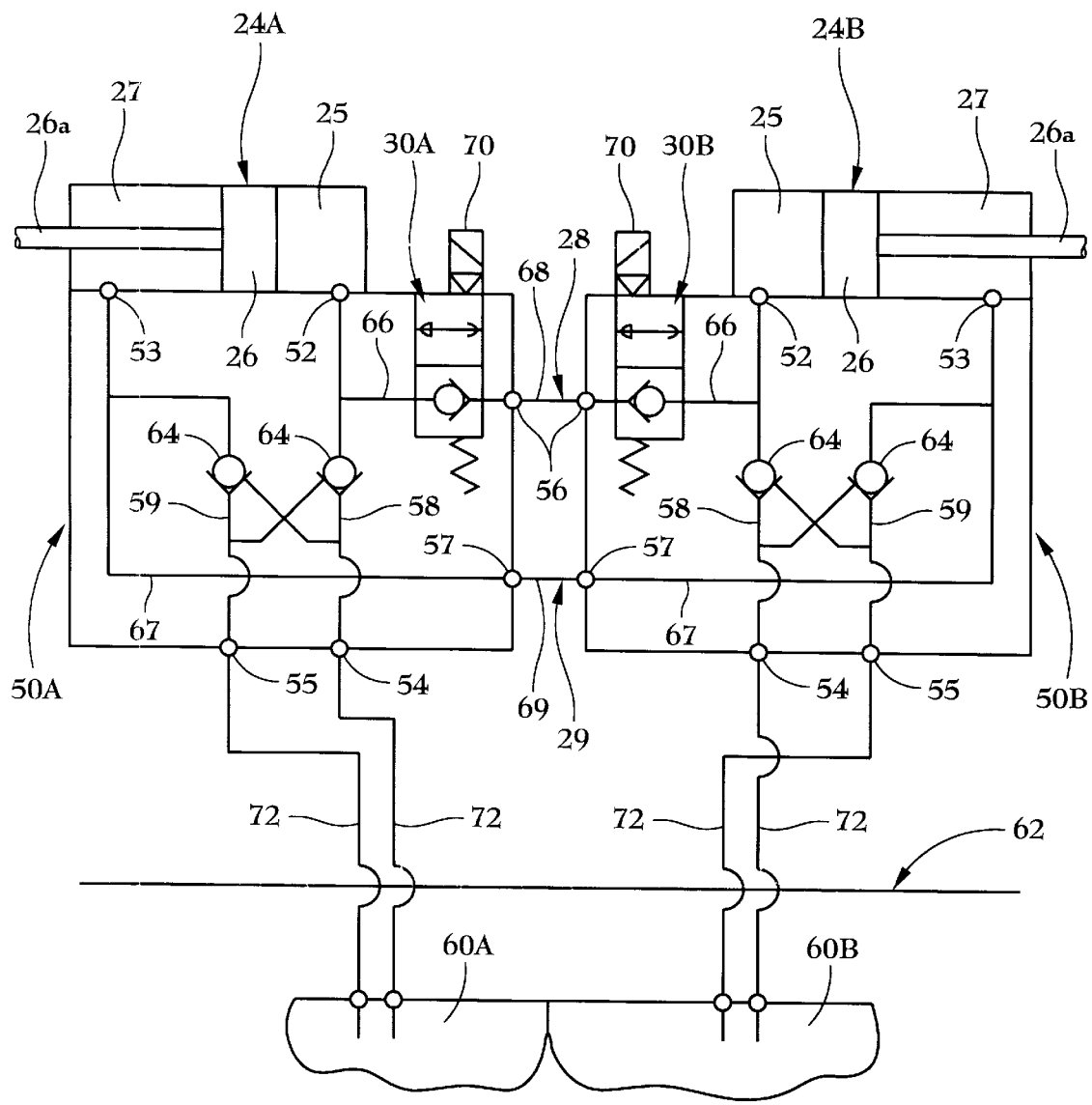
FIG. 3 is a broken-away, enlarged view of the stabilizer device portion of the diagram of FIG. 2.

Referring now to the drawings in detail, wherein like numbers are used to indicate like elements throughout, there is shown in FIGS. 1–3 an improved system 10 for leveling and stabilizing a vehicle 11 upon a ground surface S, the vehicle 11 having a frame 12 and at least one axle 14A pivotally connected with the frame 12. The system 10 basically comprises a frame leveler device 16 configured to move the frame 12 with respect to the axle 14A. A stabilizer device 20 is mounted to the frame 12 and includes a pair of arms 22A, 22B, each arm 22A, 22B having a portion 23 contactable with the ground surface S, and two hydraulic cylinders 24A, 24B. Each stabilizer cylinder 24A, 24B has a piston 26 with a rod 26a connected with a separate one of the arms 22A or 22B and a base chamber 25 on one side of the piston 26.

Further, as best shown in FIGS. 2 and 3, a fluid exchange line 28 extends between the base chamber 25 of one stabilizer cylinder 24A or 24B and the base chamber 25 of the other stabilizer cylinder 24B, 24A, respectively. Movement of the frame 12 with respect to the axle 14A when the arm portions 23 are in contact with the ground surface S causes hydraulic fluid to flow from one stabilizer cylinder 24A or 24B into the other stabilizer cylinder 24B, 24A. The flow of hydraulic fluid through the exchange line 28 causes the piston rod 26a of the one cylinder 24A or 24B to retract and the piston rod 26a of the other cylinder 24B, 24A to extend while the stabilizer arms 22A, 22B remain substantially stationary. Each of the above-described basic elements of the vehicle frame leveler and stabilizer system 10 are described in detail below.

Referring particularly to FIG. 1, the vehicle 11 is preferably a forklift vehicle that is basically constructed of the frame 12 having front and rear axles 14A, 14B movably attached to the frame 12, each axle 14A, 14B having a pair of wheels 15 mounted thereon. The axles 14A, 14B are pivotally connected to the frame 12 at the about the center of the respective axle 14A, 14B, preferably by means of a trunnion joint (not shown), so as to be movable in upward and downward directions. However, any other type of pivotal or rotatable joint may be used, such as for example a ball-in-socket joint (not shown). Preferably, both axles 14A, 14B are driven axles, although alternatively, either one of the axles 14A or 14B may function only to connect the wheels 15 mounted thereon with the frame 12.

Further, the vehicle 11 includes an operator station 13 and a working mechanism 17, preferably a "fork-lift" mechanism 17 (forks not shown), each mounted to the frame 12 at appropriate locations. Although the leveler and stabilizer system 10 of the present invention is depicted and described as being utilized with a vehicle 11 configured as a forklift having a lifting mechanism 17, it is within the scope of the present invention to incorporate the system 10 into any other type of vehicle 11 that may benefit from frame leveler and stabilizer devices. For example, the working mechanism 17 may alternatively be a backhoe, a drill, a shovel or any other construction tool or material handling apparatus (none depicted). Therefore, the present invention is not limited to being utilized with any particular type of vehicle 11.

Referring again to FIGS. 1–3, the preferred frame leveler device 16 is generally similar to known leveler devices. The leveler device 16 includes a leveler hydraulic cylinder 18 having a first end or portion 18a, preferably a cylinder body 31, connected with the vehicle frame 12. Further, the leveler cylinder 18 has a second end or portion 18b, preferably the end of the piston rod 34, connected with the front axle 14A and is movably engaged with the first, body portion 32 (i.e., by means of the piston head 33 (FIG. 2)). Although the leveler device 16 is preferably connected with the front axle 14A, it may alternatively be connected with the rear axle 14B (not shown) or another, additional leveler cylinder (not shown) may be provided that extends between the frame 12 and the rear axle 14B.

Referring particularly to FIG. 2, a valve 36 (FIG. 2) is hydraulically connected with the leveler cylinder 18 and is configured to control hydraulic flow into and out of the base chamber 35 and the rod chamber 37 of the cylinder 18. The leveler valve 36 is hydraulically connected with a controller 32, a hydraulic pump 40 and a hydraulic fluid reservoir or supply 42, so as to form a leveler hydraulic circuit 44. The controller 32 is configured to open and close the valve 36. Further, the controller 32 is also connected with a pair of exchange valves 30A, 30B and is configured to open the valves 30A, 30B when the leveler cylinder 18 moves the frame 12 with respect to the axle 14A, as described in further detail below.

Preferably, the controller 32 includes a hydraulic joystick 39 that is attached to the frame 12 near the operator station 13. The controller 32 further includes a pair of normally-open pressure switches 45A, 45B hydraulically connected with the joystick 39 and incorporated into the leveler hydraulic circuit 44. When the hydraulic joystick 39 is moved from a neutral position (at which the cylinder 18 is hydraulically "locked" as described below), a "pilot" flow of hydraulic fluid flows through the controller switches 45A, 45B such that both switches 45A, 45B are caused to close when the leveler cylinder 18 is being operated (i.e., extended or retracted). Each pressure switch 45A, 45B is electrically connected with a separate one of the two exchange valves 30A, 30B, respectively, of the stabilizer device 20, as described in further detail below.

With the above-described leveler device 16, the connected front axle 14A is adjustably positioned with respect to the frame 12 by displacing, in other words "extending" or "retracting", the piston rod 34 of the leveler cylinder 18. As the axle 14A is in contact with the surrounding ground surface S through the wheels 15, the frame 12 rather than the axle 14A is displaced by the movement of the leveler cylinder 18. Extension of the piston rod 34 causes the frame 12 to pivot or tilt about the axle joint toward the left side 11A of the vehicle 11 and retraction of the piston rod 34 causes the frame 12 to tilt toward the right vehicle side 1B. Thus, a vehicle operator moves the joystick 39 of the controller 32 so as to extend and/or retract the leveler cylinder 18 until the vehicle frame 12 is oriented at a desired position with respect to the ground surface S, typically so as to be generally horizontal or "level".

When the vehicle 11 is at a desired position/orientation, the operator releases the joystick 39 such that the valve 36 closes. With the leveler valve 36 closed, hydraulic fluid is retained or trapped within the base chamber 35 of the cylinder 18 such that the piston 33 is hydraulically "locked" at a specific position within the cylinder body 31. The vehicle frame 12 is therefore maintained at a specific orientation with respect to the axle 14A (and therefore the ground surface S) by the hydraulic locking of the leveler cylinder 18.

Referring again to FIGS. 1–3, the preferred stabilizer device 20 includes the two stabilizer arms 22A, 22B pivotally attached to the frame 12, most preferably to a base plate 46 attached to the front end of the frame 12. Each stabilizer arm 22A, 22B is preferably constructed of an upper arm half 48 pivotally connected at one end 48a with the frame 12 and a lower arm half 49 pivotally attached to the other end 48b of the upper arm half 48. Preferably, the associated stabilizer cylinder 24A or 24B is connected with the lower arm half 49, such that each interconnection of a cylinder 24A or 24B, two arm halves 48, 49 and a portion of the baseplate 46 functions in the manner of a "four-bar mechanism". However, the stabilizer arms 22A, 22B may alternatively be constructed as a single member or formed of three or more members, of any appropriate configuration, as the present invention is not limited to any particular structure of the stabilizer arms 22A, 22B.

Referring particularly to FIG. 3, the stabilizer device 20 further includes at least one and preferably two manifolds or manifold blocks 50A, 50B. Each manifold block 50A, 50B is connected with a separate stabilizer cylinder 24A, 24B, respectively, and is most preferably fixedly attached to the base end of the respective stabilizer cylinder 24A, 24B (structure not depicted). Each manifold block 50A, 50B includes a six ports: a base chamber port 52, a base operational port 54, a base exchange port 56, a rod chamber port 53, a rod operational port 55, and a rod exchange port 57. A base operational flow line or passage 58 extends between each base chamber port 52 and each base operational port 54, so as to establish flow communication between an operational valve 60A or 60B and the base chamber 25 of the particular cylinder 24A, 24B, as described below. A rod operational flow passage 59 extends between each rod chamber port 53 and each rod operational port 55 and establishes flow communication between the rod chamber 27 and the respective operational valve 60A, 60B, as also described below.

The operational passages 58, 59 of each manifold 50A, 50B connect the two chambers 25, 27 of the respective cylinder 24A or 24B to a stabilizer hydraulic circuit 62, a described below, such that extension and/or retraction of the associated piston rod 26a is actuated by hydraulic flow through the operational passages 58, 59. Preferably, each operational passage 58, 59 includes a check-valve 64 that is configured such that hydraulic fluid becomes retained or trapped between the check valves 64 and the hydraulically-connected chamber 25 or 27.

Still referring to FIG. 3, each manifold 50A, 50B further includes a base chamber exchange passage 66 extending between the base chamber port 52 and the base chamber exchange port 56, the exchange passage 66 preferably being coincident with the base operational passage 58 where each passage 58, 66 connects with the base chamber port 52. When the base chamber exchange passages 66 of the two manifolds 50A, 50B are connected together, preferably by means of a hydraulic hose 68 extending between the two base exchange ports 56, flow communication is established between the base chambers 25 of the two hydraulic cylinders 24A, 24B. In other words, the fluid line 28 or flow path 28 is established by the interconnection of the base exchange passage 66 of the first manifold 50A, the hose 68, and the base exchange passage 66 of the second manifold 50B.

Furthermore, the manifolds 50A, 50B also include a rod chamber exchange passage 67 extending between the rod chamber port 53 and the rod exchange port 57, the rod exchange passage 67 preferably being coincident with the rod operational passage 59 where each passage 59, 67 connects with the rod chamber port 53. When the rod chamber exchange passages 67 of each manifold 50A, 50B are connected together, preferably by means of a hydraulic hose 69 extending between the two rod exchange ports 57, flow communication is established between the rod chambers 27 of the two hydraulic cylinders 24A, 24B. In other words, a flow path or fluid line 29 is established by the interconnection of the rod exchange passage 67 of the first manifold 50A, the hose 69, and the rod exchange passage 67 of the second manifold 50B.

Referring to FIGS. 2 and 3, the stabilizer device 20 further includes at least one and preferably two exchange valves 30A, 30B controlling flow in the fluid line 28 between the base chambers 25 of the two stabilizer cylinders 24A, 24B. A separate exchange valve 30A, 30B is preferably disposed in each manifold block 50A, 50B, respectively, so as to control flow through the base exchange passage 66 of the particular manifold 50A or 50B. A separate valve 30A, 30B in each manifold 50A, 50B, respectively, is preferred solely for the purpose of simplifying production of the manifolds 50A, 50B, such that only one type of manifold structure rather than two different structures, need be fabricated to construct a system 10 in accordance with the present invention. However, the present invention requires only a single exchange valve 30A or 30B to operate as described herein, such that two different manifolds (not depicted) may be utilized (i.e., one with a valve and one without) or a separate valve (not depicted) may be disposed between the two manifolds 50A, 50B constructed without internally-disposed valves 30A, 30B. Further, although two manifold blocks 50A, 50B each having a valve 30A, 30B, respectively, are preferred, the system 10 of the present invention may include only a single manifold with an exchange valve or even be constructed without any manifold, as long as the fluid exchange line 28 is provided by other means, such as one or more hoses (alternative structures not depicted).

Further, each exchange valve 30A, 30B is preferably actuated by means of a solenoid 70, such that the valve 30A or 30B is automatically opened and/or closed by an electrical control signal, as discussed below. Alternatively, the exchange valves 30A, 30B may be actuated by any other means that enables the controller 32 to automatically open and close the valves 30A, 30B, such as for example, a hydraulically-actuated motor rotating a spindle (not shown).

Referring again to FIGS. 2 and 3, as discussed above, each stabilizer cylinder 24A, 24B is operated by means of an "operational" valve 60A 60B, respectively, connected with each manifold by pair of hydraulic hoses 72. Preferably, the two operational valves 60A, 60B are attached to a common manifold block 74 (FIG. 2) and are connected, through appropriate manifold porting, "in series" with each other to the hydraulic pump 40 and the hydraulic fluid reservoir 42, as described above, so as to form a stabilizer hydraulic circuit 62. The stabilizer hydraulic circuit 62 is preferably configured "in parallel" with the leveler hydraulic circuit 44, such that the flow within each hydraulic circuit 44, 62 is not directly affected by the flow through the other circuit 62 or 44.

Further, each operational valve 60A, 60B is preferably configured to direct hydraulic flow alternately into the associated base chamber operational port 54 and out of the associated rod chamber operational port 55, and vice-versa. The two valves 60A, 60B function independently of each other, such that the two stabilizer cylinders 24A, 24B, and thus the stabilizer arms 22A, 22B, may be operated independently of the other. Further, the operational valves 60A, 60B are preferably electrically actuated by appropriate means, such as by means of one or more solenoids, and are each controlled by separate controllers or separate channels of the same controller (neither depicted).

Referring again to FIGS. 1–3, the stabilizer device 20 basically functions by extending the piston rods 26a of the stabilizer cylinders 24A, 24B such that the stabilizer arms 22A, 22B, specifically contact pads 23 attached to the free ends of the lower arms halves 49, engage with the ground surface S. When the stabilizer arms 22A, 22B contact the surface S with a certain amount of force, such that the pressure of hydraulic fluid in the operational passages 58, 59 in each of the manifolds 50A, 50B reaches a predetermined pressure, the associated operational valve 60A or 60B is configured to shut-off hydraulic flow into the respective manifold 50A, 50B, causing the check valves 64 to close.

By preventing pressure in the operational passages 58, 59 from exceeding a maximum pressure, the operational valves 60A, 60B prevent the stabilizer arms 22A, 22B from "unloading" the axles 14A, 14B of the vehicle 11. If the axles 14A, 14B were unloaded of the weight of the vehicle 11, leveling of the frame 12 cannot be accomplished. Further, the closing of the check valves 64 retains or traps a certain or definite volume of hydraulic fluid within the two manifold blocks 50A, 50B and the two stabilizer cylinders 24A, 24B.

With the stabilizer arms 22A, 22B engaged with the ground surface S as described-above, the controller 32 may be used to extend and/or retract the leveler cylinder 18 to level the vehicle frame 11. When the joystick 39 of the controller 32 is moved by the operator, hydraulic fluid is caused to flow through pilot lines 43, causing each of the controller pressure switches 45A, 45B to close, such that an electrical signal is transmitted to the associated exchange valve 30A, 30B, respectively. The electrical signals activate the solenoids 70, such that each of the exchange valves 30A, 30B is opened, thereby establishing the fluid line 28 between the base chambers 25 of the two stabilizer cylinders 24A, 24B. The stabilizer cylinders 24A, 24B are then in a movable or "unlocked" state.

Thereafter, movement of the frame 12 toward a first side of the vehicle 11, for example toward the right side 11A, causes the piston rod 26a connected to the right stabilizer arm 22A, which extends outwardly past the right side 11A of the vehicle 11, to be "pushed" to a retracted position, while the associated stabilizer arm 22A remains stationary. In other words, the right cylinder rod 26a (i.e., of the right stabilizer cylinder 24A) functions as a variable length link such that the arm halves 48, 49 of the right stabilizer arm 22A do not move, but the frame 12 is able to tilt into the linkage formed by the arm halves 48, 49 and the cylinder 24A. The retraction of the right piston rod 26a forces fluid to flow out of the right base chamber 25, through the fluid line 28 and into the base chamber 25 of the left hydraulic cylinder 24B. The flow of fluid into the left cylinder base chamber 25 causes the piston rod 26a of the left stabilizer cylinder 24B to extend by an amount substantially equal to the retraction of the right piston rod 26a, such that the associated stabilizer arm 22B is maintained engaged with the ground surface S at the desired engagement force/pressure.

As a result of the movement of the piston rods 26a and the flow between the two base chambers 25, hydraulic fluid is substantially simultaneously or immediately sequentially displaced from the rod chamber 27 of the left cylinder 24B, through the rod chamber exchange flow path 29 and into the rod chamber 27 of the right stabilizer cylinder 24A. Movement or tilting of the frame 12 toward the left side 11B of the vehicle 11 causes a similar, but reversed, series of piston movements and exchange flows between the two stabilizer cylinders 24A, 24B. In either direction of frame movement, hydraulic flow is exchanged between the two base chambers 25 (and also the two rod chambers 27) as one piston rod 26a is extended and other rod 26a retracted by corresponding distances/amounts, until movement of the frame leveler cylinder 18 ceases.

When the operator determines that the vehicle frame 12 is at a desired position with respect to the axles 14A, 14B (and thus the ground surface S), the operator releases the joystick 39 of the controller 32 so that no further movement of the leveler cylinder 18 occurs. Further, the release of the hydraulic joystick controller 39 causes the flow of pilot fluid through the controller switches 45A, 45B to cease, causing the controller switches 45A, 45B return to normally-open positions. The opening of the controller switches 45A, 45B stops the transmission of electrical signals, or sends a different signal(s), to the solenoids 70 of the exchange valves 30A, 30B so that the valves 30A, 30B return to their normally-closed positions. Further, the closure of the exchange valves 30A, 30B prevents further flow communication between the base chambers 25 of the two stabilizer cylinders 24A, 24B, such that the piston rods 26a are maintained or hydraulically locked at the final positions after the leveling operation.

Due to the exchange of fluid between the base chambers 25 of the two stabilizer cylinders 24A, 24B, not only is the frame 12 capable of being leveled while the stabilizer arms 22A, 22B are deployed, the force of engagement of each arm 22A, 22B with the ground surface S remains substantially constant before and after (and also during) the frame leveling operation.

The present invention has a number of advantages over previously known systems for leveling and stabilizing a vehicle frame. With prior frame-mounted stabilizer devices, the tilting of the frame during a leveling operation is resisted or prevented by the stabilizing arm extending outwardly from that side of the frame, such that the leveler device is incapable of operating when the stabilizer arms are engaged with the ground surface. Thus, the system of the present invention has the advantage over known systems with frame-mounted stabilizers of being able to frame level with the stabilizer arms deployed, as mentioned above. Further, the system 10 of the present invention simulates the performance of systems having axle-mounted stabilizer devices, but are substantially less costly to produce.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A system for leveling and stabilizing a vehicle upon a ground surface, the vehicle having a frame and an axle pivotally connected with the frame, the system comprising:

a frame leveler device configured to move the frame with respect to the axle;

a stabilizer device mounted to the frame and including a pair of arms, each arm having a portion contactable with the ground surface, and two hydraulic stabilizer cylinders, each stabilizer cylinder having a piston with a rod connected with a separate one of the arms and a base chamber on the other side of the piston; and a fluid exchange line extending between the base chamber of one stabilizer cylinder and the base chamber of the other stabilizer cylinder;

wherein movement of the frame with respect to the axle when the arm portions are in contact with the ground surface causes hydraulic fluid to flow from one stabilizer cylinder and into the other stabilizer cylinder such that the piston rod of the one cylinder retracts and the piston rod of the other cylinder extends while the stabilizer arms remain substantially stationary.

2. The system as recited in claim 1 further comprising an exchange valve configured to control hydraulic flow through the fluid exchange line.

3. The system as recited in claim 2 wherein:

the leveler device includes a hydraulic leveler cylinder extending between the frame and the axle; and the system further comprises a controller connected with the leveler cylinder and with the exchange valve and configured to open the exchange valve when the leveler cylinder displaces the frame with respect to the axle.

4. The system as recited in claim 3 wherein:

the leveler device further includes a leveler valve configured to actuate the leveler cylinder; and the controller includes a pressure switch electrically connected with the exchange valve, the pressure switch being configured to transmit an electrical signal to the exchange valve when the leveler valve is actuated.

5. The system as recited in claim 2 further comprising a manifold fluidly connected with each of the two stabilizer cylinders, the manifold including a passage providing a portion of the fluid exchange line, the exchange valve being connected with the manifold.

6. A system for leveling and stabilizing a vehicle having a frame and an axle pivotally connected with the frame, the system comprising:

a frame leveler device including a hydraulic leveler cylinder having a first end connected with the frame and a second end connected with the axle and configured to move the frame with respect to the axle;

a stabilizer device mounted to the frame and including a pair of arms and two hydraulic stabilizer cylinders, each stabilizer cylinder having a piston with a rod connected with a separate one of the arms, a base chamber on a first side of the piston and a rod chamber on an opposing side of the piston;

a fluid exchange line extending between the base chamber of one stabilizer cylinder and the base chamber of the other stabilizer cylinder;

an exchange valve controlling flow through the fluid exchange line; and a controller connected with the leveler cylinder and with the exchange valve and configured to open the valve when the leveler cylinder displaces the frame with respect to the axle such that the stabilizer cylinders are each retractable and extendable during movement of the frame.

7. The system as recited in claim 6 wherein movement of the frame with respect to the axle causes the piston of one stabilizer cylinder to retract by a first distance and the other stabilizer cylinder to extend by a second distance, the first and second distances being substantially equal.

8. The system as recited in claim 6 further comprising a manifold fluidly connected with each of the two stabilizer cylinders, the manifold including a passage providing a portion of the fluid exchange line, the exchange valve being connected with the manifold.

9. The system as recited in claim 6 wherein each stabilizer arm has an arm portion contactable with a ground surface proximal to the vehicle and movement of the frame with respect to the axle when the arm portions are in contact with the ground surface causes hydraulic fluid to flow from one stabilizer cylinder and into the other stabilizer cylinder such that the piston rod of the one cylinder retracts and the piston rod of the other cylinder extends while the stabilizer arms remain substantially stationary.

* * * * *